US010403079B2

(12) United States Patent
Wegelin et al.

(10) Patent No.: US 10,403,079 B2
(45) Date of Patent: Sep. 3, 2019

(54) DISPENSER FUNCTIONALITY EVALUATION

(71) Applicant: GOJO Industries, Inc., Akron, OH (US)

(72) Inventors: Jackson William Wegelin, Stow, OH (US); Paul Jason Brown, Parma, OH (US); Chip Curtis, West Dundee, IL (US)

(73) Assignee: GOJO Industries, Inc., Akron, OH (US)

( * ) Notice: Subject to any disclaimer, the term of this patent is extended or adjusted under 35 U.S.C. 154(b) by 805 days.

(21) Appl. No.: 14/597,645

(22) Filed: Jan. 15, 2015

(65) Prior Publication Data

US 2015/0199865 A1 Jul. 16, 2015

Related U.S. Application Data

(60) Provisional application No. 61/927,609, filed on Jan. 15, 2014.

(51) Int. Cl.
*G06F 9/02* (2006.01)
*G07F 9/02* (2006.01)
(Continued)

(52) U.S. Cl.
CPC ............ *G07F 9/026* (2013.01); *A47K 5/1217* (2013.01); *B05B 12/004* (2013.01); *B05B 12/08* (2013.01); *B05B 12/081* (2013.01)

(58) Field of Classification Search
CPC ..... B05B 12/004; B05B 12/08; B05B 12/081; A47K 5/1217; G07F 9/026
See application file for complete search history.

(56) References Cited

U.S. PATENT DOCUMENTS 4,668,948 A * 5/1987 Merkel .................. B05B 15/02 221/1
5,381,096 A * 1/1995 Hirzel ................ G01R 31/3651 320/DIG. 21
(Continued)

FOREIGN PATENT DOCUMENTS

AU 2015206435 A1 6/2016
EP 0119057 B1 8/1988
(Continued)

OTHER PUBLICATIONS

Canadian Office Action cited in Canadian Application No. 2,936,314 dated Sep. 8, 2016, 4 pgs.
(Continued)

*Primary Examiner* — Sujoy K Kundu
*Assistant Examiner* — L. Anderson
(74) *Attorney, Agent, or Firm* — Cooper Legal Group, LLC

(57) ABSTRACT

One or more techniques and/or systems are provided for evaluating dispenser functionality of a dispenser for dispensing a material. In an example, a non-loaded electrical characteristic and/or a loaded electrical characteristic of the dispenser may be measured and evaluated to determine whether to perform a dispense event. In another example, current measurements, such as peak current, may be measured during a dispense event. The current measurements may be evaluated to determine whether a problem exists, such as a mechanical stall, a gear train problem, an actuator problem, a pump problem (e.g., a clogged pump), a mechanical impedance, and/or other issue. Such information may be collected, stored as historical data, and/or used to determine whether to perform subsequent dispense events.

20 Claims, 11 Drawing Sheets

(51) Int. Cl.
*B05B 12/00* (2018.01)
*B05B 12/08* (2006.01)
*A47K 5/12* (2006.01)

(56) References Cited

U.S. PATENT DOCUMENTS

| | | | | |
|---|---|---|---|---|
| 5,808,559 | A | 9/1998 | Buckler | |
| 6,254,832 | B1* | 7/2001 | Rainin | B01L 3/0227 422/518 |
| 2004/0058438 | A1* | 3/2004 | Fujii | G01N 35/1074 435/309.1 |
| 2006/0175341 | A1* | 8/2006 | Rodrian | A47K 10/36 221/13 |
| 2011/0062182 | A1* | 3/2011 | Reynolds | B05B 12/004 222/1 |
| 2013/0075420 | A1 | 3/2013 | Tramontina et al. | |
| 2015/0199865 | A1 | 7/2015 | Wegelin et al. | |
| 2017/0176237 | A1* | 6/2017 | Carbone, II | G01F 25/0092 |

FOREIGN PATENT DOCUMENTS

| | | | |
|---|---|---|---|
| EP | 0322981 | A2 | 7/1989 |
| EP | 2641662 | A1 | 9/2013 |
| EP | 3094420 | A1 | 11/2016 |
| JP | 560257870 | A | 12/1985 |
| WO | 1989003104 | A1 | 4/1989 |
| WO | 2015109073 | A1 | 7/2015 |

OTHER PUBLICATIONS

Canadian Office Action cited in Canadian Application No. 2,936,314 dated Feb. 23, 2017, 3 pgs.

Int. Preliminary Report cited in PCT Application No. PCT/US2015/011566 dated Jul. 1, 2016, 6 pgs.

Int. Search Report cited in PCT Application No. PCT/US2015/011566 dated May 15, 2015, 10 pgs.

* cited by examiner

DISPENSER FUNCTIONALITY EVALUATION

RELATED APPLICATION

This application is a non-provisional filing of and claims priority to U.S. Provisional Application No. 61/927,609, titled "DISPENSER FUNCTIONALITY EVALUATION" and filed on Jan. 15, 2014, which is incorporated herein by reference.

TECHNICAL FIELD

The instant application is generally directed towards dispensers for dispensing a material, such as a liquid, powder, aerosol, or other types of materials. For example, the instant application is directed to methods and/or systems for evaluating battery life, faults, and/or other operating conditions of a dispenser.

BACKGROUND

Many locations, such as hospitals, factories, restaurants, homes, etc., utilize dispensers to dispense material. For example, a dispenser may dispense a liquid material, powder material, aerosol material, and/or other materials (e.g., soap, anti-bacterial gels, cleansers, disinfectants, lotions, etc.). Some dispensers utilize a refill container for ease of maintenance, environmental concerns, etc. The refill container may, for example, comprise a pump and/or nozzle mechanism that can be used by a dispenser to dispense material from the refill container.

A dispenser may utilize a power source to perform various tasks, such as a detect user task, a validate refill container task, a dispense task, etc. In an example, a hands free dispenser may utilize a battery as a power source. In another example, the hands free dispenser may utilize a solar panel as a power source. The ability of a dispenser to dispense a material may be affected by various faults and/or other problems, such as a low or dead battery, a mechanical stall or other mechanical impedance, a clogged pump, etc.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for evaluating dispenser functionality of a dispenser for dispensing a material are provided herein. In an example, a non-loaded electrical characteristic of the dispenser may be measured (e.g., a non-loaded voltage of a power supply for the dispenser may be measured in response to detecting a request for a dispense event, such as a user activating an actuator sensor of the dispenser). Responsive to the non-loaded electrical characteristic being above a first non-loaded threshold (e.g., a measure voltage of 5.9 v that is above a 5.8 v first threshold for a 6 v dispenser), the dispense event may be performed (e.g., a material, such as soap, may be dispensed from a refill container associated with the dispenser). Responsive to the non-loaded electrical characteristic being between the first non-loaded threshold and a second non-loaded threshold (e.g., the measured voltage is between the 5.8 v first threshold and a 4.8 v second threshold for the 6 v dispenser), then a loaded electrical characteristic may be measured and evaluated against a loaded threshold in order to determine whether to perform or refrain from performing the dispense event.

During various portions of the dispense event, electrical characteristics, such as peak current, may be measured and used to evaluate dispenser functionality for the dispenser. In an example, a mechanical problem, such as a mechanical stall, a gear train problem, an actuator problem, a pump problem, and/or a mechanical impedance, may be identified based upon evaluating first peak current during a first timespan of the dispense event. In another example, a clogged pump may be identified based upon evaluating a second peak current during a second timespan of the dispense event. In another example, battery life may be determined based upon a peak current metric and a peak current timespan measured during the dispense event. In another example, a dry pump (e.g., a dispense event when a refill container is empty of material and thus no material is dispensed), a restrictor and/or a type of the restrictor (e.g., a restrictor that adds a gap between an actuator and a pump such that the actuator engages less of the pump in order to reduce an amount of material dispensed by the dispenser), operability of a transistor (e.g., whether one or more transistors used to filter motor current are working or not), a pump type (e.g., a foam pump comprising a chamber, a liquid pump, etc.), and/or other operating characteristics of the dispenser may be identified based upon an evaluation of the dispenser, such as peak current during a dispense event. Such operating characteristics, electrical characteristics, and/or metrics may be stored as dispense event evaluation data that may be used to subsequently evaluate operation of the dispenser and/or to adjust thresholds used to evaluate the dispenser. In an example, a service alert of dispense event evaluation data, operational characteristics, electrical characteristics, and/or metrics may be provided, such as over a network or a wireless communication channel to a computing device (e.g., for display through a dispenser monitoring application interface or a map, for wireless transmission such as over Bluetooth to a mobile device within a wireless communication range of the dispenser, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
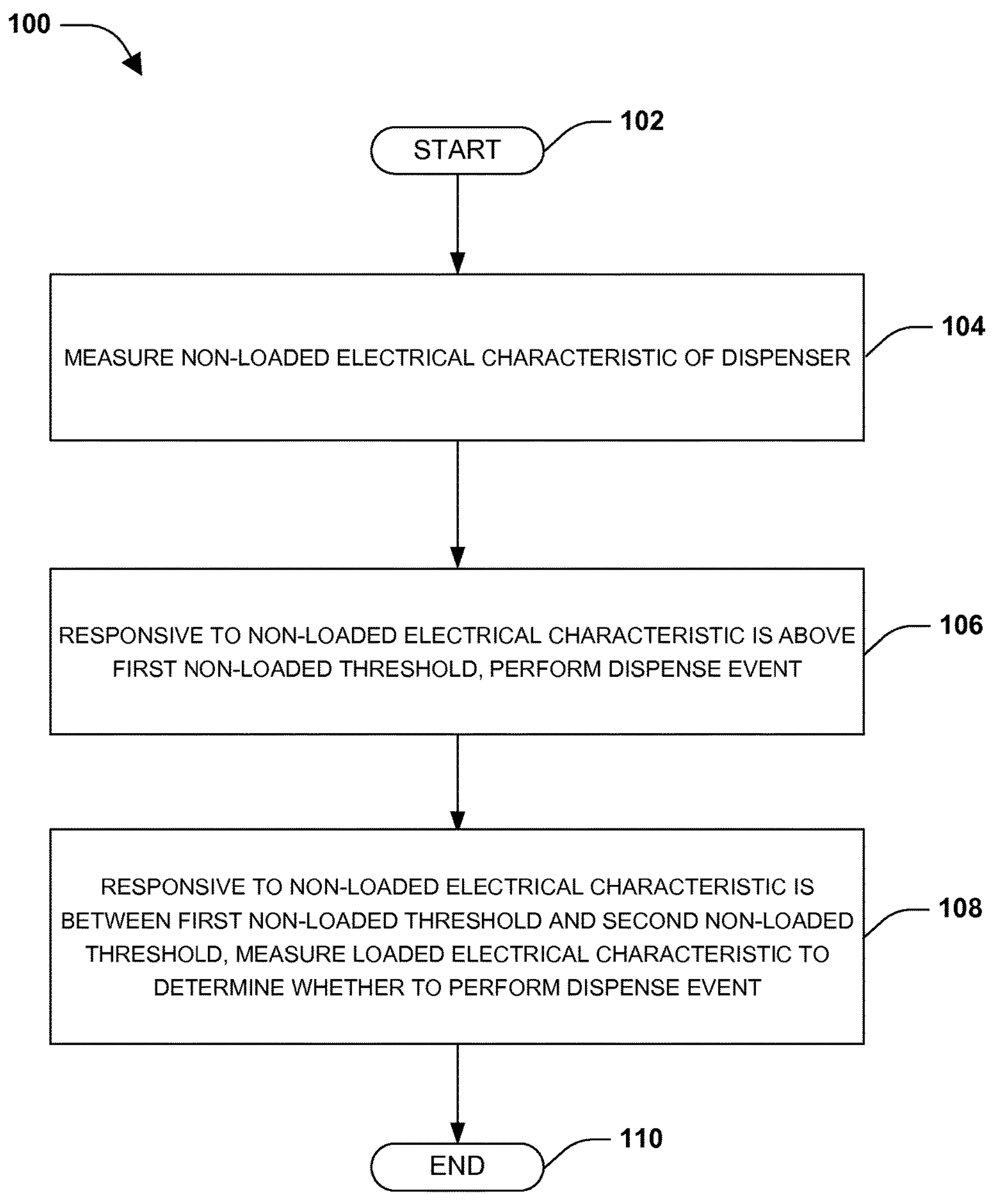
FIG. 1 is a flow diagram illustrating an exemplary method of evaluating dispenser functionality of a dispenser for dispensing material.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of evaluating dispenser functionality of a dispenser for dispensing material is illustrated by an exemplary method 100 of FIG. 1. At 102, the method starts. A dispenser may comprise various components that function to dispense material (e.g., dispense a liquid, such as soap, from a refill container). For example, the dispenser may comprise a motor, a gear train, an actuator, a power source, and/or other components (e.g., a pump and/or a dispenser nozzle associated with a refill container). Such components may experience faults, such as mechanical impedances, clogged pumps, low batteries, etc. Accordingly, as provided herein, dispenser functionality is evaluated before a dispense event and/or during the dispense event. Evaluation of the dispenser may take into account historical dispense event evaluation data and/or temporal information (e.g., a time since last actuation of a dispense event) so that appropriate action may be taken (e.g., perform a dispense event, refrain from performing a dispense event, provide an alert, etc.).

At 104, a non-loaded electrical characteristic of the dispenser may be measured. For example, a non-loaded voltage of the power supply may be measured based upon a user attempting to actuate the dispenser to perform a dispense event. At 106, responsive to the non-loaded electrical characteristic being above a first non-loaded threshold (e.g., a non-loaded voltage of 5.9 v may be above a first non-loaded threshold of 5.8 v for a 6 v dispenser), the dispense event may be performed. At 108, responsive to the non-loaded electrical characteristic being between the first non-loaded threshold and a second non-loaded threshold (e.g., a non-loaded voltage of 5.2 v may be between the first non-loaded threshold of 5.8 v and a second non-loaded threshold of 4.9 v for the 6 v dispenser), additional considerations may be taken into account. For example, a loaded electrical characteristic for the dispenser may be measured (e.g., a loaded current and/or a loaded voltage across a drivetrain, a motor, a battery or a separate load such as a current sense resistor and/or a transistor). Responsive to the loaded electrical characteristic being above a loaded threshold, performing the dispense event. Responsive to the loaded electrical characteristic being below the loaded threshold, refraining from performing the dispense event. In an example, an alert may be provided (e.g., a blinking light, a digital image message, an RF signal, communication over a network, and/or other alerts).

In an example, the non-loaded electrical characteristic and/or the loaded electrical characteristic may be evaluated against prior dispenser event evaluation data for the dispenser to determine dispenser operating data for the dispenser. For example, if the dispenser operating data indicates a mechanical stall or a clogged pump, then the dispense event may be refrained from being performed. In another example, a time since last dispense metric may be identified and/or used to evaluate the non-loaded electrical current characteristic and/or the loaded electric current characteristic.

In an example, the first non-loaded threshold, the second non-loaded threshold, and/or the loaded threshold may be adjusted based upon dispense event evaluation data for the dispenser (e.g., non-loaded electrical characteristics, loaded electrical characteristics, peak current information, and/or other information collected from prior evaluations of the dispenser). For example, a threshold may have been initially set to a factory setting. The threshold may be adjusted based upon performance of the dispenser (e.g., a particular dispenser model may utilize a relatively more efficiency battery, gear train, lubrication, etc.).

Dispenser functionality may be evaluated and/or recorded during the dispense event. In an example, first peak current may be measured during a first timespan of the dispense event (e.g., a peak or average current measurement derived from one or more current measurement samplings during a first 0.25 seconds of a 1 second dispense event). The first peak current may be evaluated to identify a mechanical problem associated with the dispenser, such as a mechanical stall, a gear train problem, an actuator problem, a pump problem, and/or a mechanical impedance. In an example, an alert of the mechanical problem may be provided. In an example, dispense event evaluation data may be generated based upon the mechanical problem. For example, the dispense event evaluation data and/or other information (e.g., a time span since a prior dispense event) may be evaluated before and/or during a subsequent dispense event in order to determine whether to perform a subsequent dispense event. If the dispense event evaluation data is indicative of more than one issue, then fuzzy logic may be implemented to determine whether to dispense or not (e.g., if a battery has a relatively high charge and a pump clog was detected over a threshold amount of time prior to a current time, then a dispense event may be performed in an attempt to remove the clog).

In another example, a second peak current may be measured during a second timespan of the dispense event (e.g., a peak or average current measurement derived from one or more current measurement samplings during a final 0.75 seconds of a 1 second dispense event). The second peak current may be evaluated to identify a pump problem associated with the dispenser, such as a clogged pump. In an example, an alert of the pump problem may be provided. In an example, dispense event evaluation data may be generated based upon the pump problem. For example, the dispense event evaluation data and/or other information (e.g., a time span since a prior dispense event) may be evaluated before and/or during a subsequent dispense event in order to determine whether to perform a subsequent dispense event.

Figure 7A:
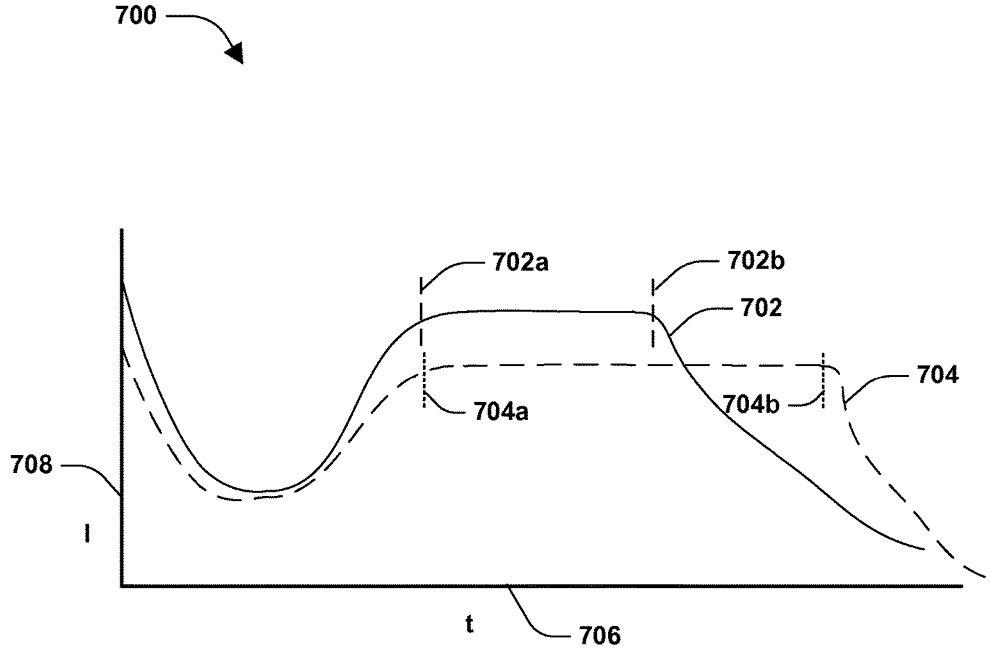
FIG. 7A is an illustration of an example of a graph.
Figure 7B:
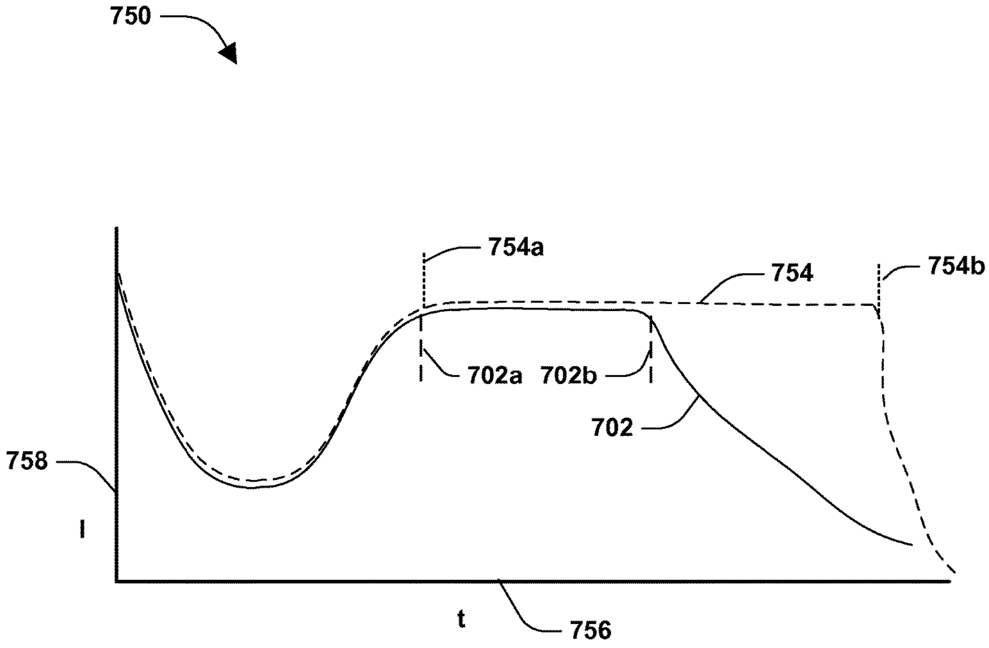
FIG. 7B is an illustration of an example of a graph.
Figure 8:
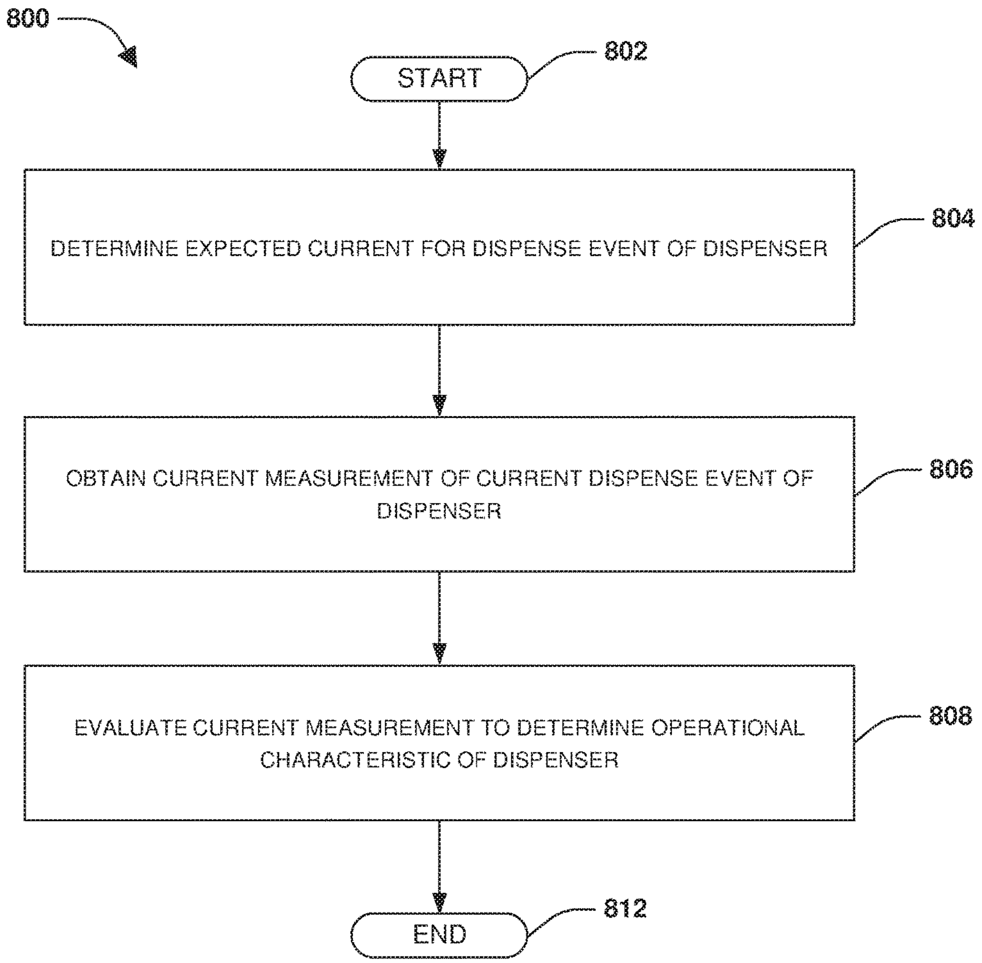
FIG. 8 is a flow diagram illustrating an exemplary method of evaluating dispenser functionality of a dispenser for dispensing material.

In another example, a peak current metric and/or a peak current timespan metric may be measured to generate current characteristic data for the dispense event (e.g., FIGS. 7 and 8). A battery status for the dispense event may be determined based upon the current characteristic data (e.g., a relatively lower peak current and/or a relatively longer peak current timespan may be indicative of a relatively lower battery charge). Responsive to the battery status being below a dispense power metric (e.g., below 15% battery power), dispense event evaluation data may be generated and/or an alert may be provided based upon the battery status. For example, the dispense event evaluation data may be evaluated to determine whether a subsequent dispense event is to be performed or not. At 110, the method ends.

Figure 2:
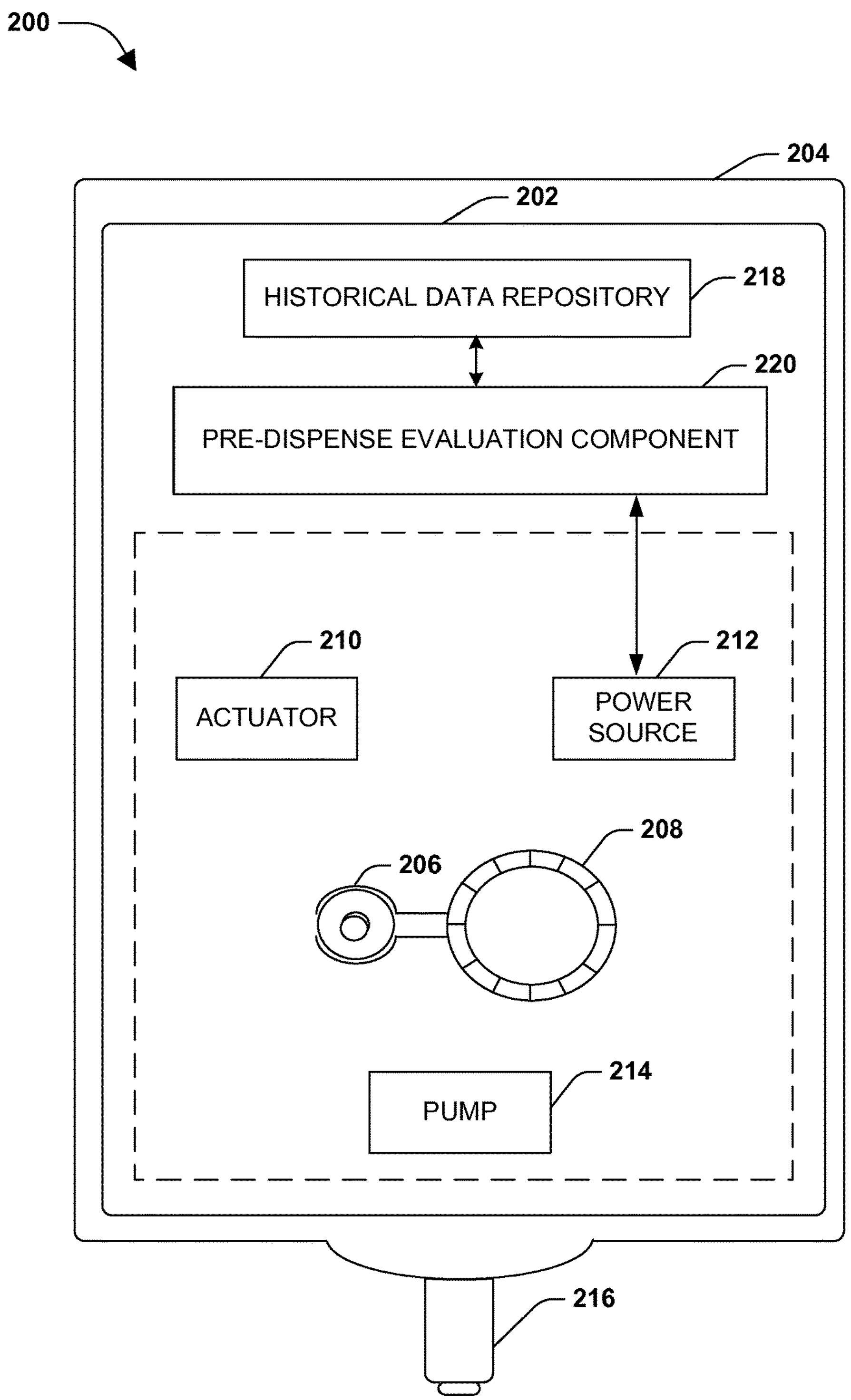
FIG. 2 is a component block diagram illustrating an exemplary system for evaluating dispenser functionality of a dispenser for dispensing a material.

FIG. 2 illustrates an example of a system 200 for evaluating dispenser functionality of a dispenser 204 for dispensing a material. The dispenser 204 may comprise a housing 202 configured to hold a refill container comprising a material (e.g., a liquid material, a powder material, an aerosol material, an antibacterial product, etc.). The housing 202 may comprise various mechanical and/or electrical components that facilitate operation of the dispenser 204, such as one or more components that dispense material from the refill container. In an example, the housing 202 may comprise an actuator 210, a power source 212, a motor 206, a drivetrain 208 (e.g., a gear train), and/or other components (e.g., a pump 214 and/or a dispenser nozzle 216 associated with the refill container). The power source 212 (e.g., a battery, an AC adapter, power from a powered network communication line, etc.) may provide power to the actuator 210, the motor 206, and/or other components. The actuator 210 may be configured to detect a dispense request (e.g., a user may place a hand in front of an actuation sensor; the user may press an actuation button or lever; etc.). The actuator 210 may be configured to invoke the motor 206 to operate the drivetrain 208 so that the pump 214 dispenses material from the refill container through the dispenser nozzle 216.

The system 200 may comprise a pre-dispense evaluation component 220 and/or a historical data repository 218. The pre-dispense evaluation component 220 may be configured to evaluate the dispenser 204, such as the power source 212, before a dispense event. For example, the pre-dispense evaluation component 220 may be configured to measure a non-loaded electrical characteristic of the dispenser 204, such as a non-loaded voltage of the power source 212. In an example, the pre-dispense evaluation component 220 may evaluate the non-loaded electrical characteristic based upon dispense event evaluation data stored within the historical data repository 218 (e.g., a time since last dispense, a prior measured voltage, a prior measured peak current, a prior alert, a prior measured battery level, etc.). In another example, the pre-dispense evaluation component 220 may store the non-loaded electrical characteristic into the historical data repository 218 for subsequent evaluations of the dispenser 204. Responsive to the non-loaded electrical characteristic being above a first non-loaded threshold, a dispense event may be performed (e.g., in response to a dispense request detected by the actuator 210). Responsive to the non-loaded electrical characteristic being between the first non-loaded threshold and a second non-loaded threshold, further evaluation of the dispenser 204 may be performed (e.g., FIG. 3).

Figure 3:
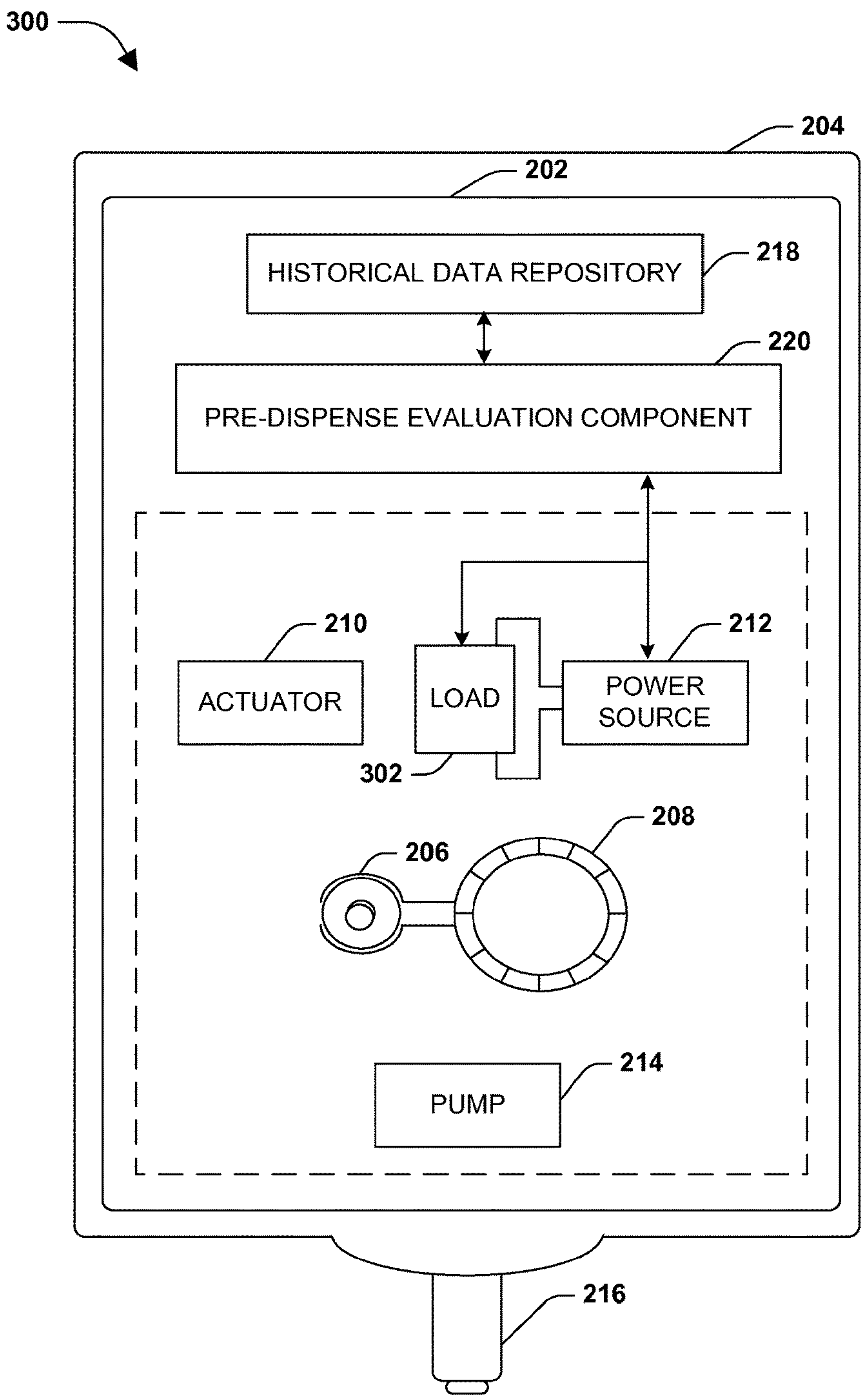
FIG. 3 is a component block diagram illustrating an exemplary system for evaluating dispenser functionality of a dispenser for dispensing a material.

FIG. 3 illustrates an example of a system 300 for evaluating dispenser functionality of a dispenser 204 for dispensing a material. The system 300 may comprise a pre-dispense evaluation component 220. The pre-dispense evaluation component 220 may be configured to measure a loaded electrical characteristic of the dispenser 204. For example, the pre-dispense evaluation component 220 may measure a loaded voltage across a load 302, such as a current sense resistor. In an example, the pre-dispense evaluation component 220 may evaluate the loaded electrical characteristic based upon dispense event evaluation data stored within a historical data repository 218 (e.g., a time since last dispense, a prior measured voltage, a prior measured peak current, a prior alert, a prior measured battery level, etc.). In another example, the pre-dispense evaluation component 220 may store the loaded electrical characteristic into the historical data repository 218 for subsequent evaluations of the dispenser 204. Responsive to the loaded electrical characteristics being above a loaded threshold, a dispense event may be performed (e.g., in response to a dispense request detected by an actuator 210). Responsive to the loaded electrical characteristic being below the loaded threshold, the dispense event may be refrained from being performed.

Figure 4:
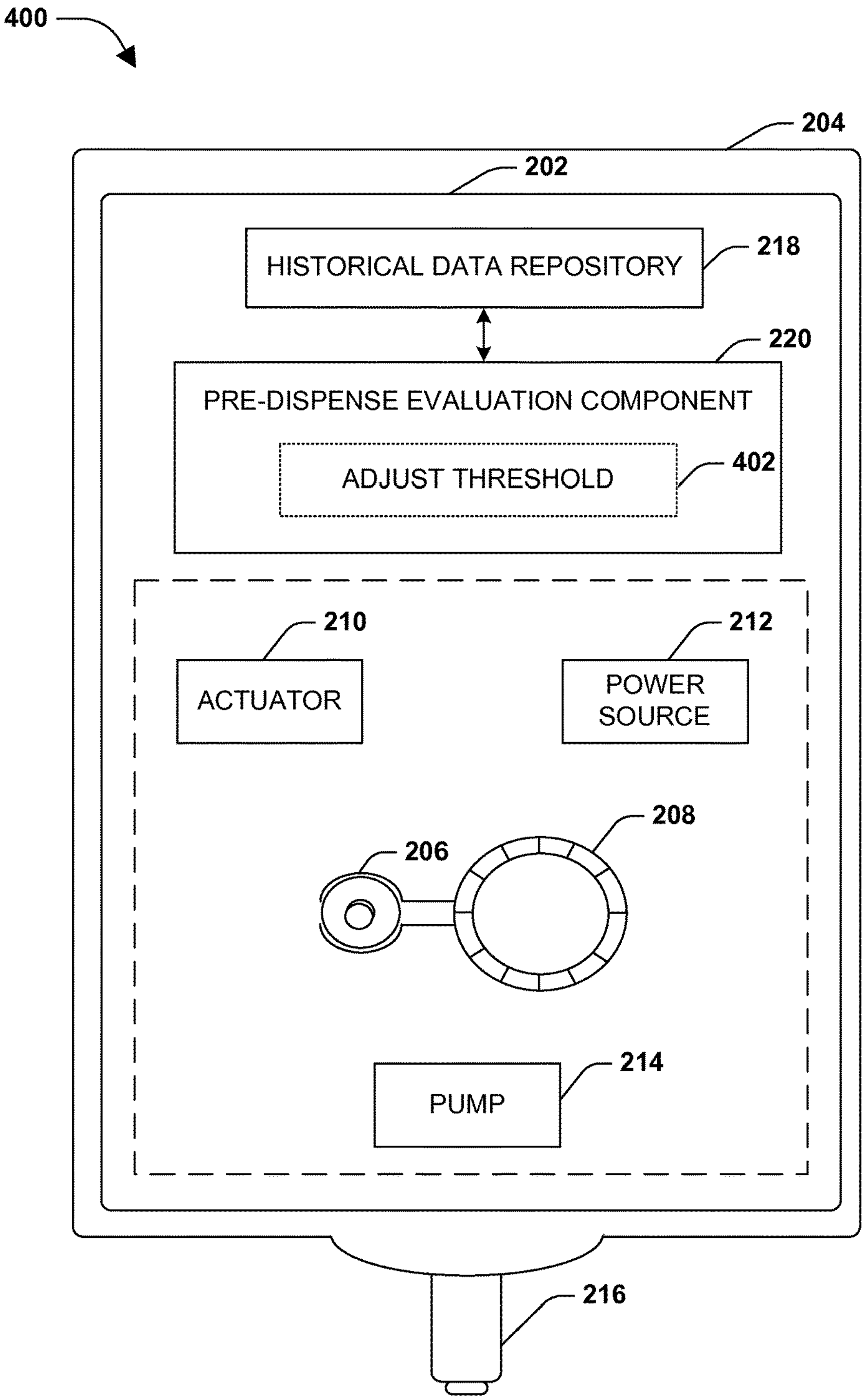
FIG. 4 is a component block diagram illustrating an exemplary system for maintaining one or more thresholds used to evaluate a dispenser.

FIG. 4 illustrates an example of a system 400 for maintaining one or more thresholds used to evaluate a dispenser 204. The system 400 may comprise a pre-dispense evaluation component 220. The pre-dispense evaluation component 220 may be configured to evaluate various aspects of the dispenser 204 utilizing a first non-loaded threshold (e.g., such as about 5.8 v for a 6 v dispenser), a second non-loaded threshold (e.g., such as about 4.9 v for the 6 v dispenser), a loaded threshold (e.g., such as about 4.2 v for the 6 v dispenser), a peak current metric, a peak current timespan, and/or other thresholds. The pre-dispense evaluation component 220 may be configured to adjust a threshold based upon dispense event evaluation data within a historical data repository 218. For example, the loaded threshold may be factory set as 4.2 v. The dispense event evaluation data may indicate that the dispenser 204 has operated normally at voltages below 4.2 v, such as 3.9 v, due to the dispenser 204 being relatively efficient (e.g., a drivetrain 208 may have been recently upgraded to a relatively more efficient model). Accordingly, the pre-dispense evaluation component 220 may be configured to adjust 402 the loaded threshold for future evaluations of the dispenser 204.

Figure 5:
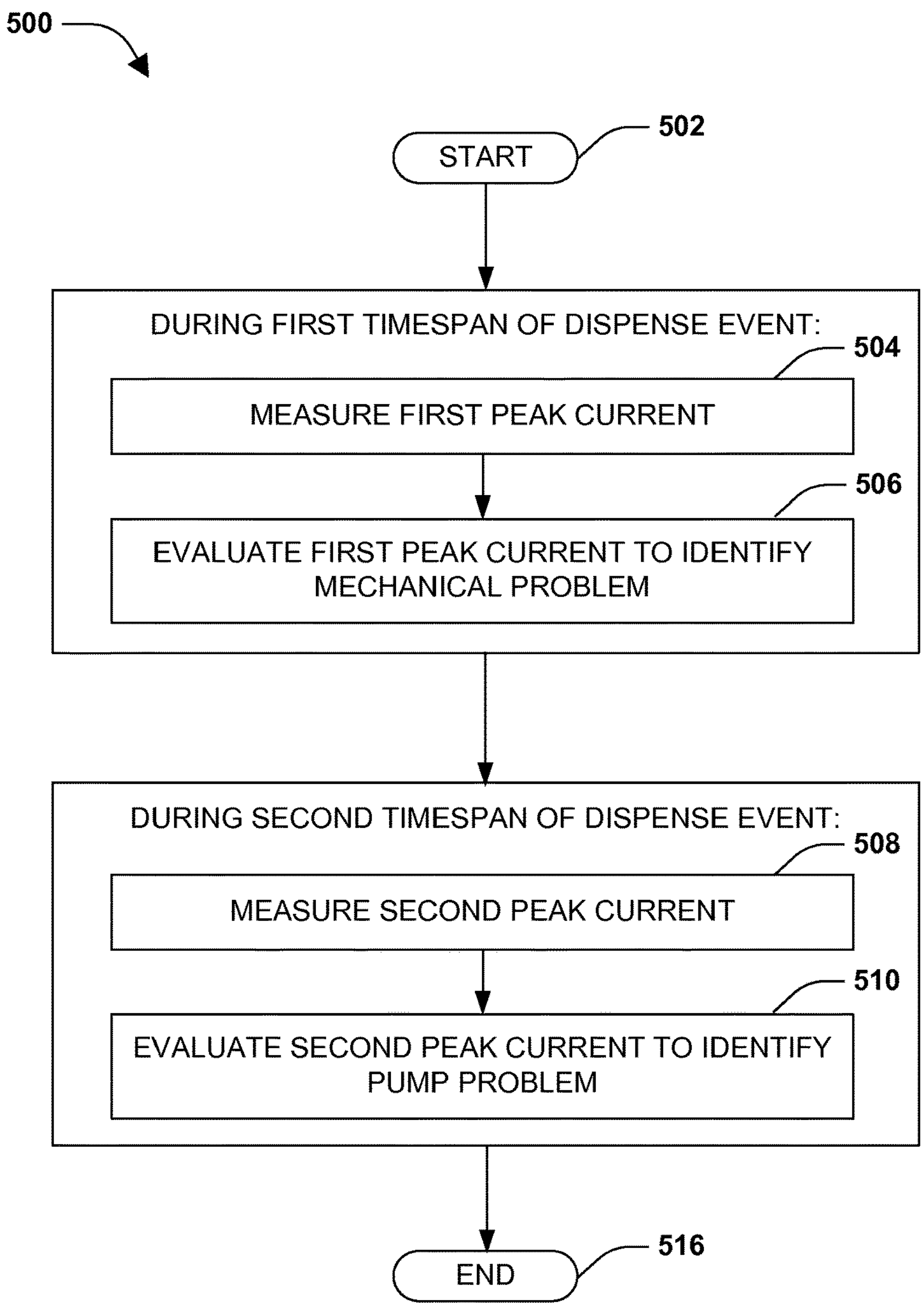
FIG. 5 is a flow diagram illustrating an exemplary method of evaluating dispenser functionality of a dispenser for dispensing material.

An embodiment of evaluating dispenser functionality of a dispenser for dispensing material is illustrated by an exemplary method 500 of FIG. 5. At 502, the method starts. At 504, a first peak current may be measured during a first timespan of a dispense event. At 506, the first peak current may be evaluated to identify a mechanical problem associated with the dispenser, such as a mechanical stall, a gear train problem, an actuator problem, a pump problem, and/or a mechanical impedance. For example, the first peak current may be evaluated to determine that a current, measured within the dispenser, reached a relatively higher peak value than expected (e.g., a current above a range of 1-4 amps), which may be indicative of the mechanical problem. In an example, an alert of the mechanical problem may be provided.

At 508, a second peak current may be measured during a second timespan of the dispense event. At 510, the second peak current may be evaluated to identify a pump problem, such as a clogged pump. For example, the second peak current may be evaluated to determine that a current, measured within the dispenser, reached a relatively higher peak value than expected and/or maintained the relatively higher peak value for a relatively longer duration than expected, which may be indicative of a clogged pump. In an example, an alert of the pump problem may be provided. At 516, the method ends.

Figure 6:
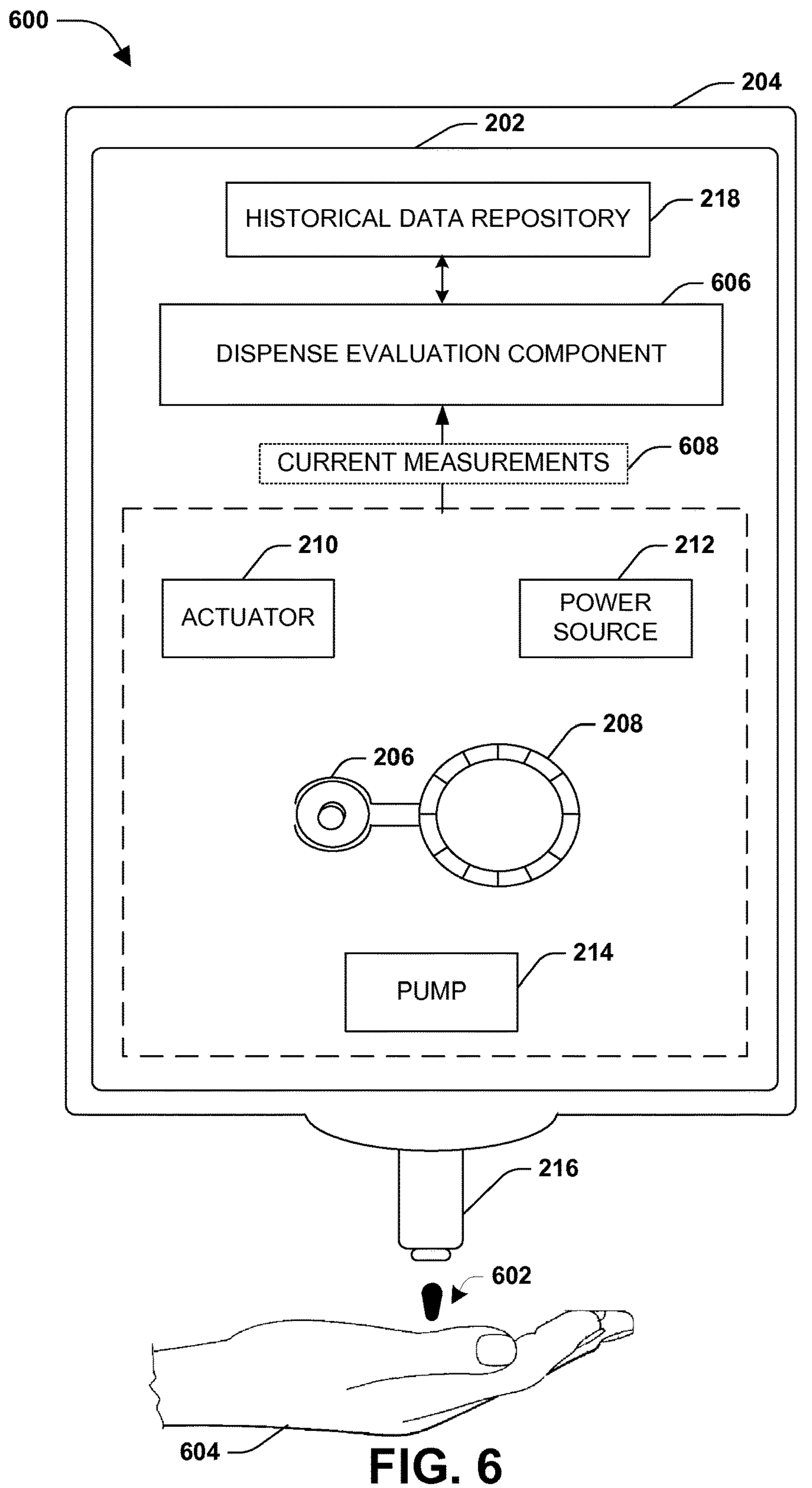
FIG. 6 is a component block diagram illustrating an exemplary system for evaluating a dispenser during a dispense event.

FIG. 6 illustrates an example of a system 600 for evaluating a dispenser 204 during a dispense event. In an example, the dispenser 204 initiates the dispense event based upon a user activating an actuator 210 with a hand 604. During the dispense event, a power source 212 may supply power to a motor 206 that drives a drivetrain 208 so that a pump 214 dispenses a material 602 through a dispenser nozzle 216 into the hand 604 of the user. The system 600 may comprise a dispense evaluation component 606 and/or a historical data repository 218. The dispense evaluation component 606 may be configured to obtain current measurements 608 during various portions of the dispense event, such as during a first timespan (e.g., a first quarter of the dispense event), a second timespan (e.g., a last three fourths of the dispense event), etc. The current measurements 608 may be evaluated against various peak current thresholds and/or expected current curves (e.g., FIGS. 7 and 8) to determine whether a problem exists, such as a pump problem of the pump 214, a mechanical stall of the motor 206, a drivetrain problem of the drivetrain 208, an actuator problem of the actuator 210, a mechanical impedance, and/or other issues. In an example, the dispense evaluation component 606 may be configured to evaluate the current measurements 608 against dispense event evaluation data within the historical data repository 218 (e.g., evaluate prior current measurements and/or a time since last dispense to determine whether a problem is a single occurrence or a trending problem, whether to raise an alarm, whether to adjust a threshold, whether to perform or refrain from performing a dispense event, etc.). In an example, the dispense evaluation component 606 may store the current measurements 608 within the historical data repository 218 for later evaluation of the dispenser 204.

FIG. 7A illustrates an example of a graph 700 comprising a time axis 706 and a current axis 708. An expected current curve 702 may correspond to current values that may be expected during various portions of a normal dispense event. For example, a peak current range may span from point 702*a* to point 702*b*. In an example, a measured current curve 704 may correspond to measured current values during a dispense event. For example, a measured peak current range may span from point 704*a* to point 704*b*. The measured current curve 704 may be evaluated against the expected current curve 702 to identify whether the dispenser is functioning as expected or has a problem. For example, a low battery status may be determined based upon the measured current curve 704 have a relatively lower peak current than the expected current curve 702 and/or based upon the measured peak current range between point 704*a* and point 704*b* having a relative longer duration than the expected peak current range between point 702*a* and point 702*b*. In this way, a dispenser may be evaluated by comparing the measured current curve 704 against the expected current curve 702.

FIG. 7B illustrates an example of a graph 750 comprising a time axis 756 and a current axis 758. An expected current curve 702 may correspond to current values that may be expected during various portions of a normal dispense event. For example, a peak current range may span from point 702*a* to point 702*b*. In an example, a measured current curve 754 may correspond to measured current values during a dispense event. For example, a measured peak current range may span from point 754*a* to point 754*b*. The measured current curve 754 may be evaluated against the expected current curve 702 to identify whether the dispenser is functioning as expected or has a problem. For example, a mechanical stall problem (e.g., a stall of a motor) may be determined based upon the measured peak current range between point 754*a* and point 754*b* having a relative longer duration than the expected peak current range between point 702*a* and point 702*b*. In this way, a dispenser may be evaluated by comparing the measured current curve 754 against the expected current curve 702.

An embodiment of evaluating dispenser functionality of a dispenser for dispensing material is illustrated by an exemplary method 800 of FIG. 8. At 802, the method starts. At 804, an expected current for a dispense event of the dispenser may be determined based upon a non-loaded voltage of the dispenser. For example, the non-loaded battery voltage may be obtained when a motor of the dispenser is off (e.g., when the dispenser is not performing a dispense event). The non-loaded voltage may be evaluated based upon a slope-intercept function to determine a peak normal current that the motor should draw during a normal dispense event (e.g., a non-problematic dispense event such as without a clog, a dry pump, a mechanical impedance, a gear train problem etc.). The slope-intercept function may take into account a motor load, an internal battery resistance, and/or other information for determining the expected current based upon the non-loaded voltage. At 806, a current measurement of a current dispense event of the dispenser may be obtained. For example, the current measurement may comprise a peak current, a current measurement curve, etc.

At 808, the current measurement may be evaluated against the expected current to determine an operational characteristic of the dispenser. In an example, if the current measurement is less than the expected current, then the operational characteristic may indicate that a dry pump of no material was performed because less current was used for the dry pump than if the dispenser had to pump out material that would have utilized more current. The dry pump may indicate that a refill container of the dispenser is empty because the dispenser did not dispense material. In another example, the operational characteristic may indicate a type of pump utilized by the dispenser, such as a liquid pump, a foam pump, etc. For example, a dispenser with a foam pump, comprising a chamber such as an air chamber and/or a liquid chamber, may draw more current (e.g., additional current may be drawn to perform work by the chamber) than a liquid pump without such a chamber.

In another example, the operational characteristic may indicate whether the dispenser utilizes a restrictor for an actuator of the dispenser. If the dispenser does not comprise a restrictor, then the actuator may be positioned such that the actuator may immediate engage with a pump during actuation and thus the current measurement curve may have an initial increase in current corresponding to the start of the actuation because the actuator may immediately engage with the pump resulting in a draw of current. If the dispenser comprises the restrictor for the actuator, then the restrictor may be positioned such that the restrictor does not immediately engage with the pump during actuation (e.g., dead space, such as an inch or any other amount of dead space, may exist between the restrictor and the pump such that a user pushing against the actuator does not immediate push the restrictor against the pump and thus the dispenser may dispense less material for an actuation) and thus the current measurement curve may have a delay or flat portion with little to no current draw because the initial increase in current occurs once the restrictor finally engages with the pump. A type of restrictor may be identified based upon a length of the delay or flat portion of the current measurement curve.

In another example, the operational characteristic may correspond to an operational status (e.g., working, broken, operating out of spec, etc.) of one or more transistors (e.g., a field-effect transistor) within the dispenser. For example, the dispenser may comprise a first transistor (e.g., a high side transistor) and a second transistor (e.g., a low side transistor) that are in series with the motor. In an example, a capacitor may be located at a junction between the first transistor and the second transistor (e.g., the capacitor may be in parallel with one of the transistors and may be shunted to ground). The capacitor may be used for filtering motor current. In an example, the first transistor (e.g., the high side transistor) may be tested by turning on the second transistor (e.g., the low side transistor) to see if the capacitor is pulled down to ground or has a voltage charge. In another example, the second transistor (e.g., the low side transistor) may be tested by turning on the first transistor (e.g., the high side transistor) to see if the capacitor is charged to a voltage charge or is the second transistor pulling the capacitor down to ground.

In an example, a service alert may be created based upon the operational characteristic. The service alert may be sent over a network to a computing device (e.g., over an Ethernet connection, a WiFi connection, etc.) or may be providing to the computing device utilizing a wireless communication signal (e.g., a Bluetooth connection to a mobile device). The service alert may be displayed through a website (e.g., a dispenser monitoring website), through a map populated with a dispenser user interface element representing the dispenser (e.g., a display property, such as color or size, of the dispenser user interface element may be modified to indicate the service alert; a textual description of the service alert may be provided based upon a user selecting the dispenser user interface element, etc.), and/or an application user interface (e.g., a dispenser monitoring application). At 812, the method ends.

Figure 9:
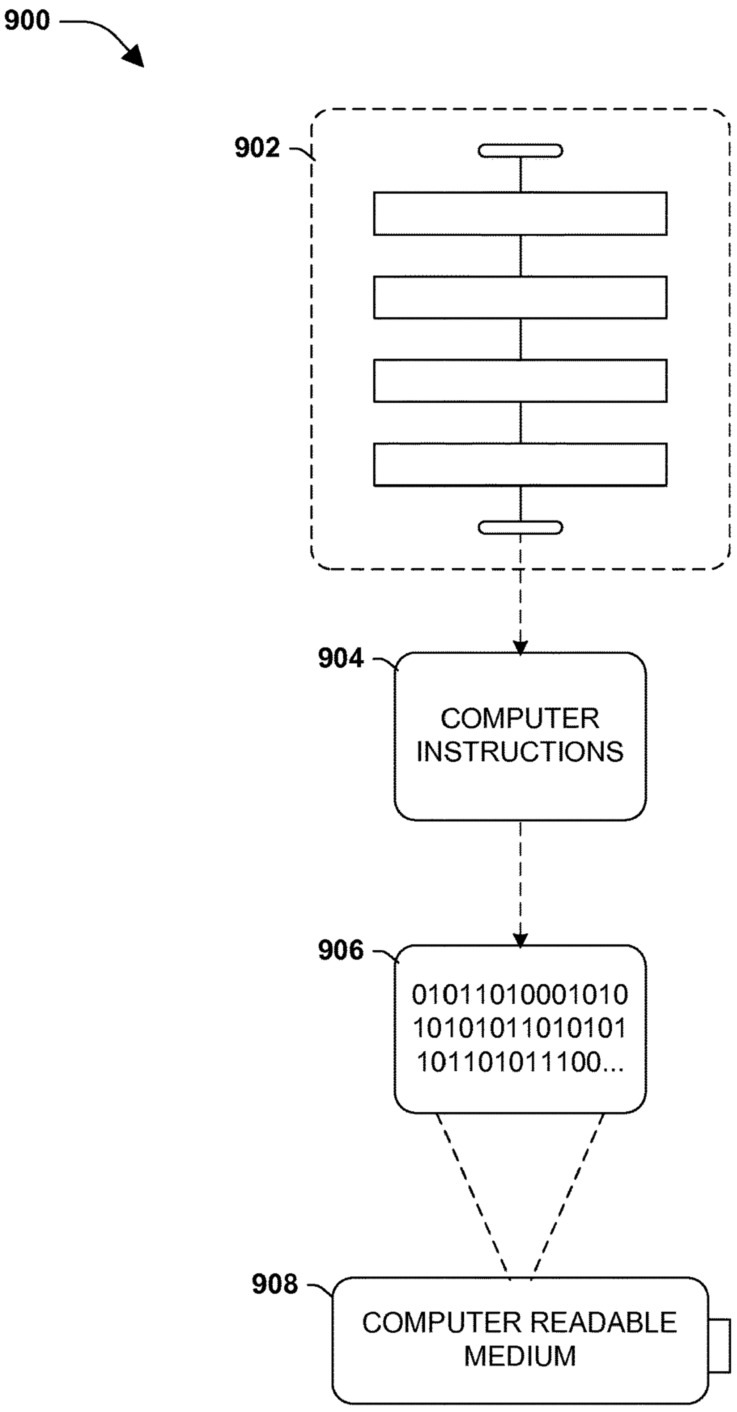
FIG. 9 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 100 of FIG. 1, at least some of the exemplary method 500 of FIG. 5, and/or at least some of the exemplary method 800 of FIG. 8, for example. In some embodiments, the processor-executable instructions 904 are configured to implement a system, such as at least some of the exemplary system 200 of FIG. 2, at least some of the exemplary system 300 of FIG. 3, at least some of the exemplary system 400 of FIG. 4, at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 10:
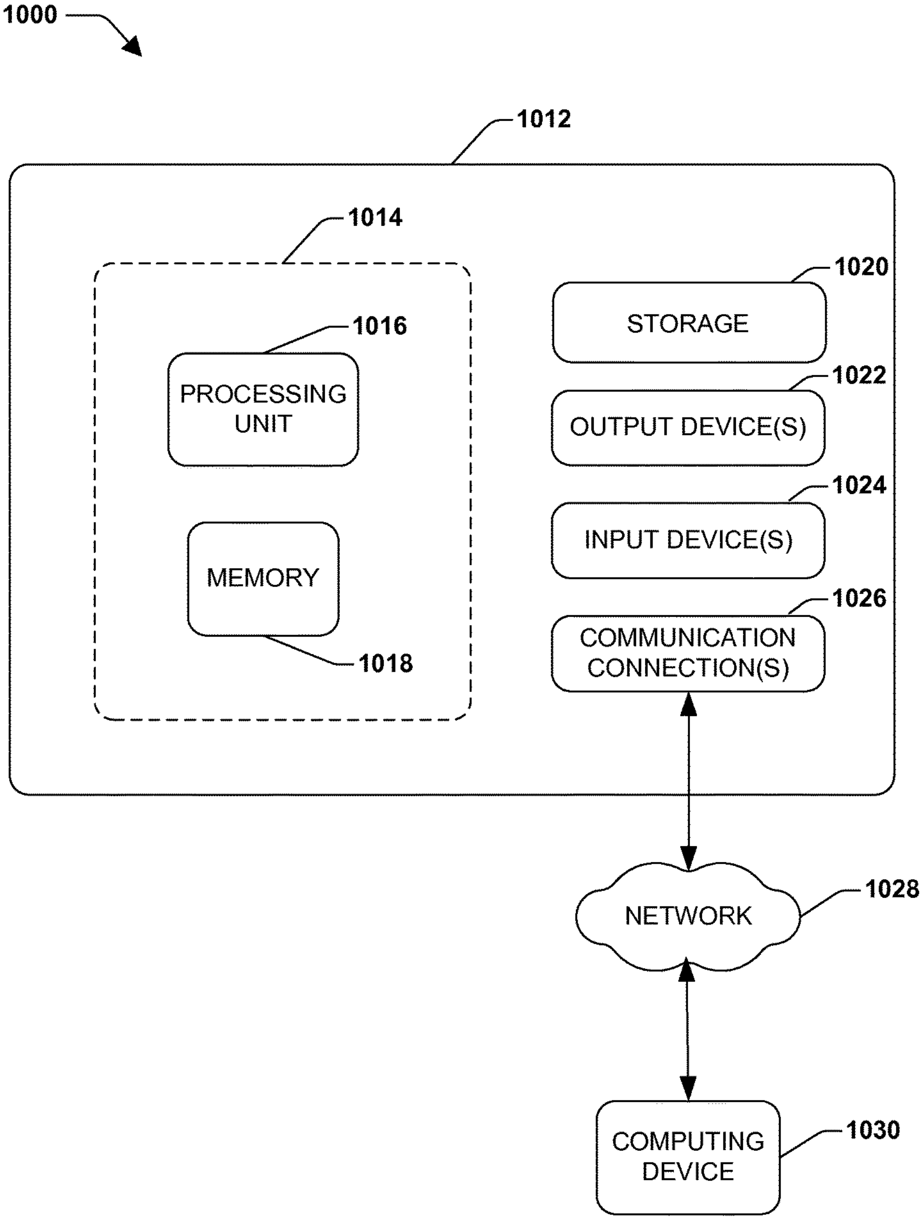
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via a network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for evaluating dispenser functionality of a dispenser for dispensing a material, comprising:

measuring a first electrical characteristic of the dispenser across a power supply of the dispenser while no dispense event is being performed;

responsive to the first electrical characteristic being above a first threshold, performing a dispense event to dispense the material, wherein performing the dispense event comprises actuating a motor of the dispenser to dispense the material through a dispenser nozzle of the dispenser; and responsive to the first electrical characteristic being between the first threshold and a second threshold:

measuring a second electrical characteristic of the dispenser across a load on the power supply while no dispense event is being performed;

responsive to the second electrical characteristic being above a third threshold, performing the dispense event to dispense the material; and responsive to the second electrical characteristic being below the third threshold, refraining from performing the dispense event.

2. The method of claim 1, the measuring a second electrical characteristic comprising:

measuring at least one of a current or a voltage across a drivetrain motor load.

3. The method of claim 1, the measuring a second electrical characteristic comprising:

measuring at least one of a current or a voltage across a load separate from a drivetrain and the motor of the dispenser.

4. The method of claim 1, comprising:

identifying dispense event evaluation data for the dispenser;

evaluating the second electrical characteristic against the dispense event evaluation data to determine dispenser operating data for the dispenser;

responsive to the dispenser operating data not being indicative of a dispense event problem, performing the dispense event; and responsive to the dispenser operating data being indicative of a dispense event problem, refraining from performing the dispense event.

5. The method of claim 1, comprising:

responsive to the second electrical characteristic being below the third threshold, providing an alert.

6. The method of claim 1, comprising:

during a first timespan of the dispense event:

measuring a first peak current; and evaluating the first peak current to identify a mechanical problem associated with the dispenser.

7. The method of claim 6, the mechanical problem comprising at least one of a mechanical stall, a gear train problem, an actuator problem, a pump problem, or a mechanical impedance.

8. The method of claim 6, comprising at least one of:

generating prior dispense event evaluation data based upon the mechanical problem; or providing an alert of the mechanical problem.

9. The method of claim 1, the measuring a first electrical characteristic comprising:

measuring at least one of a current or a voltage across the power supply.

10. The method of claim 1, comprising:

during the dispense event:

measuring a peak current metric and a peak current timespan metric to generate current characteristic data for the dispense event;

determining a battery status for the dispense event based upon the current characteristic data; and responsive to the battery status being below a dispense power metric, at least one of:

generating prior dispense event evaluation data based upon the battery status; or providing an alert of the battery status.

11. The method of claim 1, comprising:

identifying dispense event evaluation data for the dispenser; and adjusting at least one of the first threshold, the second threshold, or the third threshold based upon the dispense event evaluation data.

12. A system, comprising:

a pre-dispense evaluation component configured to:

measure a first electrical characteristic of a dispenser across a power supply of the dispenser while no dispense event is being performed;

responsive to the first electrical characteristic being above a first threshold, perform a dispense event to dispense a material; and responsive to the first electrical characteristic being between the first threshold and a second threshold:

measure a second electrical characteristic of the dispenser across a load on the power supply while no dispense event is being performed;

responsive to the second electrical characteristic being above a third threshold, perform the dispense event to dispense the material; and responsive to the second electrical characteristic being below the third threshold, refrain from performing the dispense event; and a motor configured to be actuated during the dispense event to dispense the material through a dispenser nozzle of the dispenser.

13. The system of claim 12, comprising:

a dispense evaluation component configured to:

during a first timespan of the dispense event:

measure a first peak current; and evaluate the first peak current to identify a mechanical problem associated with the dispenser.

14. The system of claim 12, wherein:

the pre-dispense evaluation component is configured to measure the first electrical characteristic by measuring at least one of a current or a voltage across the power supply, and the pre-dispense evaluation component is configured to measure the second electrical characteristic by measuring at least one of a current or a voltage across a drivetrain motor load.

15. The system of claim 12, the pre-dispense evaluation component configured to:

identify dispense event evaluation data for the dispenser; and adjust at least one of the first threshold, the second threshold, or the third threshold based upon the dispense event evaluation data.

16. A method for evaluating dispenser functionality of a dispenser for dispensing a material, comprising:

determining an expected current measurement for a dispense event of the dispenser;

performing the dispense event by dispensing the material, wherein performing the dispense event comprises actuating a motor of the dispenser to dispense the material through a dispenser nozzle of the dispenser;

obtaining a measured current measurement of the dispense event of the dispenser; and evaluating the measured current measurement against the expected current measurement to identify a component of the dispenser that is experiencing a problem based upon a time during the dispensing event at which the measured current measurement deviates from the expected current measurement.

17. The method of claim 16, wherein the component comprises at least one of a pump, a restrictor, or a transistor.

18. The method of claim 16, comprising:

sending a service alert over a network to a computing device indicating that the component is experiencing a problem.

19. The method of claim 16, the evaluating comprising:

comparing the expected current measurement to the measured current measurement to identify the time during the dispensing event at which the measured current measurement deviates from the expected current measurement; and evaluating which of a plurality of components of the dispenser is likely to be experiencing a problem based upon the time during the dispensing event at which the measured current measurement deviates from the expected current measurement to identify the component that is experiencing the problem.

20. The method of claim 16, the evaluating comprising comparing a peak of the expected current measurement to a peak of the measured current measurement to identify the component of the dispenser that is experiencing a problem.

* * * * *